United States Patent Office 3,294,505
Patented Dec. 27, 1966

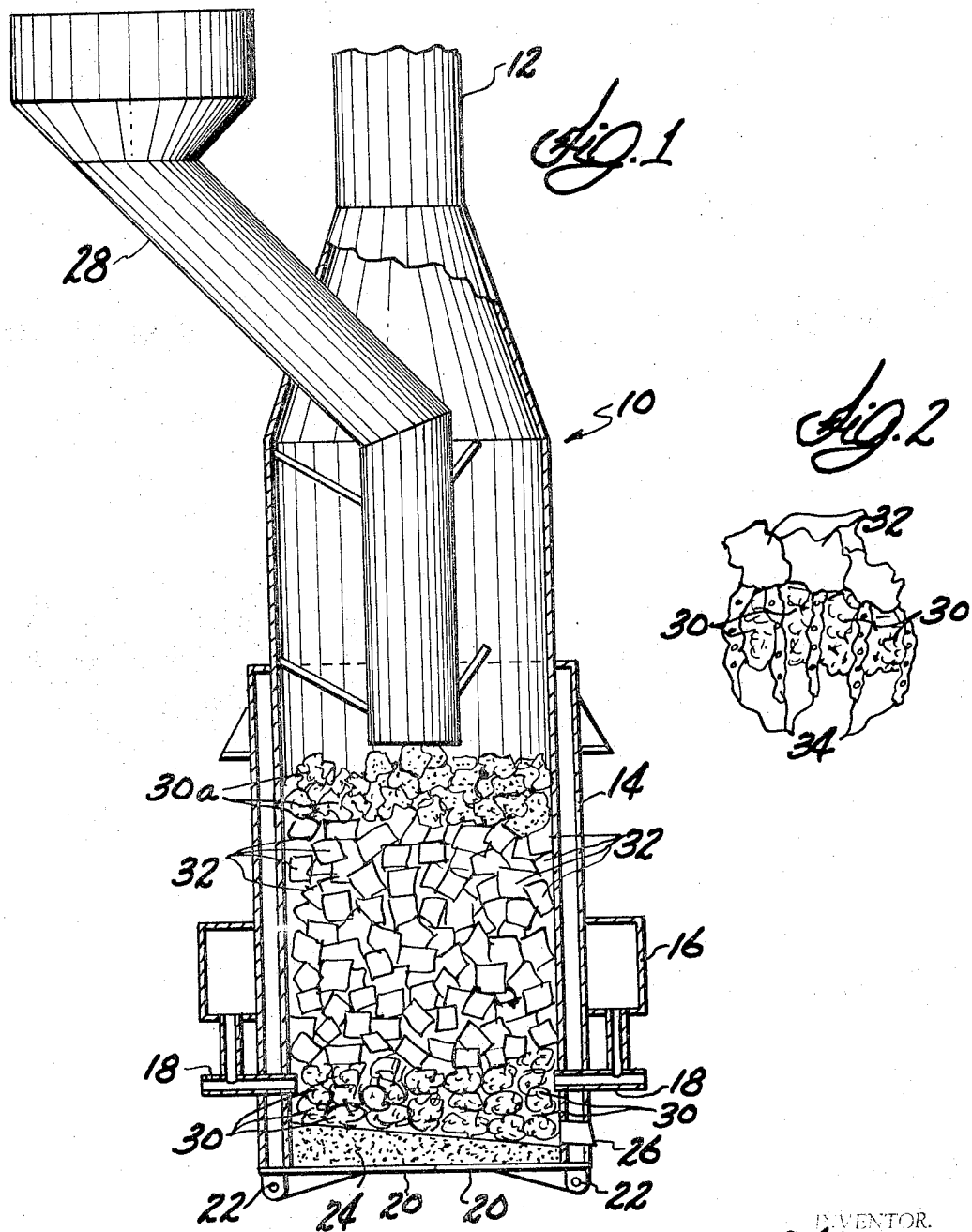

3,294,505
PROCESS OF PRODUCING GLASS IN A CUPOLA
Jack W. Garrison, Evanston, Ill., assignor to United States Gypsum Company, Chicago, Ill., a corporation of Illinois
Filed Dec. 27, 1963, Ser. No. 334,025
8 Claims. (Cl. 65—17)

The present invention relates to the production of glass and more particularly to the melting in a cupola of glass for the production of uniform fine fibers.

Present methods for the production of glass fibers employ a furnace containing a tank holding the molten glass. These tanks are relatively huge refractory structures containing up to 1000 tons of glass in a pool 3 to 5 feet in depth which is heated from above. Because of the high temperatures involved their fabrication requires highly skilled labor and the use of expensive materials. In addition, large heat exchangers nearly as big as the furnace are needed to conserve the heat values in the fuel.

The charge to this tank may be either glass marbles having a definitely known composition or finely divided raw materials for making up the batch of glass or a mixture of each. The exact feeding procedures, mixtures employed, melting temperatures, homogenizing steps, etc., vary from furnace to furnace and constitute one of the arts of the industry. At the temperatures ordinarily employed, a glass batch residence time of about 24 hours is common, perhaps a quarter of the time being devoted to "melting" and the remainder to "fining" and homogenizing the glass batch. The fining and homogenizing steps require a long time because the glass in the tank is relatively quiescent, agitation being caused only by thermal gradients within the glass which produce some convection. In general, it may be stated that homogeneity of the glass which is so sought after is affected by and is dependent upon each and every step which goes into the preparation of the glass from the grinding, sizing, mixing of the raw materials to its shaping into a final product.

It is very difficult to adjust the output of a glass furnace to varying production schedules, and demands must be anticipated far in advance. Initial heating and charging of the glass tank can easily consume several days, and when demand slackens, production cannot be halted completely, but must be maintained at a low level, even though the glass produced in this period must be wasted. Attempts to increase production in periods of great demand through employment of elevated temperatures decreases the life of the refractories making up the furnace. Moreover, there are some indications that these elevated temperatures promote segregation in the glass batch, thus defeating their purpose. The long start-up and cooling-down time for a conventional glass furnace requires that, for economical operation, its duty cycle must be of about three years' duration.

Of all the physical properties of glass which must be considered in manufacturing articles from it, viscosity is one of the more important. Glass does not have a melting point in the usual sense of the term, but as its temperature is raised, it gradually softens until a point is reached where it can be worked into the desired form. As is well known in the art, glass at the proper viscosity can be drawn into flexible strong fibers of great utility.

This same viscosity characteristic which is so desirable in forming glass has, heretofore, made it impossible to melt glass in a cupola. As usually operated, a vertical cupola is charged with a layer of fuel, preferably coke, at the bottom, to a depth equal to about ½ to ¼ of the diameter of the cupola. This is followed by a layer of material to be melted, and further layers of fuel and raw materials may be added, these materials being of such shape and size that a large number of interconnecting voids remain throughout the charge. These voids vent the combustion products when the coke is burned and, therefore, are essential to the operation. The coke on the bottom of the bed is consumed in melting the material above it, and when succeeding layers are employed, is replaced by these layers as the charge of molten material is withdrawn.

Oxygen for combustion of the coke may be supplied as air through the conventional tuyeres near the bottom of the cupola. As the charge melts near the top of the white hot coke bed, it trickles down through the coke bed to a shallow pool in the bottom of the cupola and finally out of the notch into means for further processing, such as fiberizing apparatus.

When used for melting slag, this process proceeds without difficulty because the slag melts sharply to give a low viscosity liquid, but when glass or glass batch materials are charged to a cupola and an attempt made to melt them, they soften to a coherent viscous plastic mass which spreads across the interior of the cupola and seals off the gas passages. This so restricts the combustion of the coke fuel that the melting cannot be continued.

The cupola has many advantages over the glass tank, among which are low installed cost, high production rate, flexibility and low operating expense. A large production cupola when melting slag can be started up or shut down in a matter of hours without damage to adjust to varying production schedules. Rates of production in excess of several thousand pounds per hour are readily achieved.

An added advantage results from the geometry of the cupola and its charge. In a conventional glass furnace, wherein the glass is heated from above through radiation and convection, only about 20% of the heat in the fuel is transferred to the glass. In the cupola, about 25% of the heat in the fuel is transferred to the melted product.

Because of the advantages of the cupola for melting slag numerous attempts have been made to modify its structure or manner of operation so that glass could be melted but none of the proposals has been introduced commercially. Centrally mounted internal structures to support the glass batch material as it melted failed to keep the melt from sealing off the cupola. Wall mounted inclined baffles likewise did not prevent such sealing. Equally unsuccessful were arrangements employing down draft combustion and unorthodox stack valving in attempts to maintain adequate venting of the combustion products. However, despite these problems, it is apparent that the devising of a method by which glass could be melted in a cupola would represent a decided advance in the art.

It is an object of this invention therefore to enable a cupola to provide a high speed and flexible source of molten glass. It is a further object of this invention to provide a high speed and flexible source for molten glass especially suitable for making glass fibers.

A still further object of this invention is to provide a means for rapidly melting glass raw materials. Another object is to provide a flexible means for rapidly and continuously melting glass raw materials and refining the product thereof.

A still further object is to provide a method of combining the glass raw materials into a form suitable for melting in a cupola.

It is a further object to provide a complete process for converting glass raw materials into drawn glass fibers.

A further object is to provide a suitable composition of glass that can be successfully melted and homogenized in a cupola.

Another object of this invention is to provide a glass composition capable of being melted in a cupola and of being drawn into fibers of acceptable quality.

It is a further object to provide a glass composition which is economical, and possesses viscosity characteristics which enable it to be melted and refined and homogenized in a cupola, and after such processing, to be drawn successfully into fine, uniform fibers.

These and other objects which will be apparent from the following description of the invention are obtained in part through the discovery of a soda-lime borosilicate glass composition which can be manufactured from raw materials capable of being formed into briquettes which will melt in a cupola without forming a cohesive reaction stopping mass. The composition of the glass allows it to be refined and homogenized in a cupola and its viscosity permits its being drawn and attenuated into fibers in an economical fashion.

The difficulties of the prior art have been overcome by providing a glass which has a viscosity of not more than about 200 poises at a temperature of 2100 degrees Fahrenheit. Desirably the viscosity at this temperature should be considerably lower, between about 15 and about 200 poises, preferably between about 20 and about 50 poises. At 2500 degrees F., the glass should have a viscosity of less than about 50 poises and preferably less than about 30 poises. Viscosity of glasses useful in this process will ordinarily have a viscosity of more than 2 and probably about 10 poises at 2500 degrees Fahrenheit but the lower limit has not been found to be critical for the melting and fining steps. For drawing into fibers the glass should have a viscosity of between about 30 and 500 poises and preferably about 100 poises at 1900° F.

Glasses with the desirable viscosity characteristics required in my invention may be composed of the oxides of calcium, sodium, boron and silicon in the proportion of about 3½ to about 5 moles of oxides of silicon and boron, and preferably about 4, to each two moles of oxides of calcium and sodium, wherein the relative molar proportions are expressed by the following relationships:

$X$CaO + $(2-X)$Na$_2$O = 2 wherein X is between about 0.5 and about 1.5, and $Y$B$_2$O$_3$ + $(Z-Y)$SiO$_2$ = Z wherein Y is between about 0.25 and about 1.5 and Z is between about 3.5 and about 5.

Glass to this formula may have a silica content of about 34 to about 68 percent, B$_2$O$_3$ between about 5 and about 31 percent, a calcium oxide content between about 5 and about 27 percent, and a sodium oxide content of about 7 to about 28 percent.

Because commercially available low cost materials are seldom pure, the above compounds may constitute only about 90% of the glass and the remaining 10% may be composed of the oxides and fluorides of aluminum, magnesium, potassium, iron and phosphorous and mixtures thereof.

This latter group is more in the nature of impurities, and may not be considered critical with the exception that no single impurity should be larger than 5%, at which point it approaches a major ingredient in size. Fluorine in particular, in amounts exceeding 5% of the total should be avoided as it tends to promote devitrification. To achieve proper viscosity control, which is so essential to successful melting in a cupola and drawing of fibers, it has been found necessary to limit the silica content to about 57%. The other components may vary within the ranges shown above. To the extent that the impurities affect the composition, those skilled in the art recognize what modifications in the major ingredients need be made to restore the viscosity characteristics of the molten glass to the desired values. When no impurities are present it is necessary to hold Y to slightly higher values, e.g., above about 0.5 when Z=4 and above 0.9 when Z=5 so that the silica content does not become excessive. A preferred formula (X=1.0; Y=0.7; Z=4.0) within the above proportions has approximately the composition shown in Table I. It has a viscosity of about 100 poises at 1900° F., 30 poises at 2100° F. and about 10 poises at 2500° F.

The viscosities were determined by the well-known concentric cylinder method, the inner cylinder being rotated, in an atmosphere of nitrogen, using carbon cylinders.

Referring to the drawings herein, FIG. 1 is a partially diagrammatical sectional elevation view of a cupola being utilized to practice this invention, and FIG. 2 is a schematic representation of the melting and flowing of the glass-forming material in the cupola of FIG. 1.

The cupola 10 is of conventional construction, including a stack 12, a water jacket 14, an air bustle pipe 16, tuyeres 18 communicating with the air bustle pipe and leading to the interior of the cupola, bottom doors 20 hinged at 22, a sand bottom 24, and an outlet notch 26. A charging hopper 28 is provided, through which materials may be charged to the cupola. The cupola 10 is illustrated with a layer of lumps of coke 30 at the bottom thereof, a layer of briquettes 32, prepared in accordance with this invention, deposited over the coke 30, and further lumps of coke 30a over the briquettes 32.

TABLE I

*Glass for melting in a cupola*

|  | Percent |
|---|---|
| SiO$_2$ | 50.2 |
| B$_2$O$_3$ | 13.0 |
| CaO | 14.3 |
| Na$_2$O | 15.4 |
| F$_2$ | 3.0 |
| Al$_2$O$_3$ | 1.8 |
| MgO | 2.3 |

To prepare the raw materials for the cupola, they are finely ground (nearly all will pass through a 50 mesh screen) which assists rapid and uniform melting, mixed thoroughly and then formed into briquettes 32 for charging into the cupola 10.

It is desirable that the binder used in forming the briquettes be capable of reacting with the other raw materials to form a portion of the glass. It should develop a surface which is hard and temperature stable, so that small particles will not dust off to be carried out of the cupola with the off-gases and should not burn out and allow the briquettes to disintegrate before the sintering preceding the melting has begun. 0 grade sodium silicate, having about 9.16% Na$_2$O and 29.5% SiO$_2$ is the preferred binder, but other inorganic binders, such as aluminum phosphate, may also be used. Certain organic binders with high temperature stability may also be employed, such as phenolic core sand binder resins, asphaltic emulsions, etc.

The fineness to which the raw materials are ground affects the speed with which the silicate binder will set. When an excessive amount of raw material is less than 200 mesh, the setting becomes so rapid that shaping the briquettes quickly enough becomes rather difficult.

The amount of coke or other fuel employed is based upon the amount of glass raw materials to be melted, and the briquette:coke ratio may vary between 2 to 1 to about 6 to 1, with a ratio of 5.5 to 1 being preferred for a 54″ cupola. Other ratios may be more satisfactory for other cupolas.

The operation of the invention is demonstrated by the following examples which are intended to be illustrative only and not limiting.

*Example 1.*—A batch of ingredients for the preferred formula shown in Table I was prepared from the following raw materials:

|  | Pounds | Percent |
|---|---|---|
| "Calumite" [1] | 67.7 | 20.4 |
| Razorite [2] | 58.5 | 17.3 |
| Soda Ash | 46.5 | 13.8 |
| Silica Sand | 112 | 33.4 |
| Fluorspar | 18.9 | 5.6 |
| "O" Grade Sodium Silicate | 32 | 9.5 |
| Total | 336.6 | 100 |

[1] Calumite is beneficiated slag made by the Illinois Slag Company and is a mixture of a calcium aluminum silicate and a calcium magnesium silicate supplying the following oxides in about the proportions shown in Table II. Most of the iron has been removed.
[2] Razorite is a mineral similar to borax, but without the water of crystallization. Impurities generally make it useful only in glasses where color is unimportant.

TABLE II

*Calumite—typical composition*

|  | Percent |
|---|---|
| Silicon dioxide | 38.0 |
| Aluminum oxide | 11.7 |
| Calcium oxide | 40.0 |
| Magnesium oxide | 8.0 |
| Others | Balance |

The dry ingredients were ground until 100% would pass through a 100 mesh screen, the grinding being controlled so that most of the particles were larger than 200 mesh. The dry ingredients were blended in a ribbon mixer for several minutes, after which the sodium silicate, dissolved in two gallons of water, was added for further mixing. A temperature rise of 50 to 80 degrees F. resulted from the ensuing reaction. The wet mix was then quickly formed into briquettes in a Fleming hand operated block machine and cast onto pallets, where they were hardened and were either air or oven dried. The size was 3½" x 4" x 8", but each was broken in half before charging to the cupola.

Seventy pounds of coke 30 was charged to a 24" cupola, followed by 280 pounds of the dried briquettes 32, followed by alternate layers of coke and briquettes of similar size until the cupola was fully charged. The charging procedure was repeated at about twenty-minute intervals or as necessary to maintain the solids at the desired level after cupola operation had begun and molten material was being withdrawn.

The temperatures reached in the cupola were in the order of 3500 degrees F., which enable the glass melting to progress very rapidly. The melt produced was agitated by flowing over the hot coals as illustrated schematically in FIG. 2 wherein the lumps 30 represent the burning coke, lumps 32 represent the superadjacent briquettes, and the streamlets 34 represent the material flowing from the briquettes downward over the burning coke. This served to give a uniform product much more rapidly than the quiescent conditions of the glass tank. As the molten material flowed downward through the cupola, it contacted the rising hot gaseous combustion products, which may be rich in carbon monoxide. This counter current treatment with hot gases is believed to greatly assist in removing the seeds, or small bubbles which result from the melting process, so that as the molten material (referred to herein as refined) issued from the cupola, it only contained relatively large bubbles which were easily removed in subsequent processing.

The melt issued from the cupola through notch 26 at a temperature between 2000 and 2400 degrees F., was quite fluid and contained some gas bubbles. A sample withdrawn at this point solidified to a black glass with a conchoidal fracture and appeared brown in thin sections.

To develop a uniform and stable viscosity in the melt before spinning it into fibers, it was passed through a forehearth (not shown) in a stream with a depth of two inches in a path of 8 feet (residence time 5 to 15 minutes).

From the forehearth, the melt was fed at a temperature of 1900 degrees F. to a centrifugal fiberizer (not shown) of a type known in the art and employing a rotor basket having ¾ mm. orifices. With no secondary attenuation, the fibers issued with an average diameter of 11 microns and were obtained with a 14% total shot. With secondary attenuation much finer fibers were produced.

They were light gray, almost silvery, in color and satisfactorily passed the compressibility and other usual quality tests. The small percentage of relatively large bubbles in the melt were readily removed during the centrifugal spinning operation and no difficulties in the making of fibers resulted therefrom. Examination of the fibers revealed no inclusions of unmelted or unreacted material, indicating that a completely reacted, homogeneous glass had been obtained in less than twenty minutes' reaction time. Under similar conditions a fifty-four inch diameter commercial cupola can produce 4000 to 6000 pounds of glass per hour.

*Example 2.*—The procedure of Example I was repeated but with the quantities of raw materials adjusted to give a finished glass of the composition shown in Table III. This formula corresponds to the equation when $X=0.47$, $Y=0.935$ and $Z=4.25$.

TABLE III

*Glass for melting in a cupola*

|  | Percent |
|---|---|
| $SiO_2$ | 47.0 |
| $B_2O_3$ | 15.1 |
| CaO | 6.0 |
| $Na_2O$ | 22.2 |
| $F_2$ | 2.1 |
| $Al_2O_3$ | 4.3 |
| MgO | 2.1 |
| $K_2O$ | 1.2 |

This glass had a viscosity of about 35 poises at 1900 degrees F., about 18 poises at 2100 degrees F. and about 9 poises at 2500 degrees F. This glass melted very well in the cupola and was spun into satisfactory fibers without difficulty.

*Example 3.*—The procedure of Example 1 was repeated but with the quantities of raw materials adjusted to yield a glass of the composition shown in Table IV. For this composition $X=1.1$, $Y=0.32$ and $Z=4.1$.

TABLE IV

*Glass for melting in a cupola*

|  | Percent |
|---|---|
| $SiO_2$ | 57.1 |
| $B_2O_3$ | 5.8 |
| CaO | 15.5 |
| $Na_2O$ | 13.6 |
| $F_2$ | 1.6 |
| $Al_2O_3$ | 3.6 |
| MgO | 2.1 |
| $K_2O$ | 0.7 |

This glass had a viscosity of over 500 poises at 1900 degrees F., about 200 poises at 2100 degrees Fahrenheit and a viscosity of about 25 poises at 2500 degrees Fahrenheit and, therefore, represents a more viscous type of glass than that employed in the foregoing examples and one near the upper limits of viscosity and silica content. However, with careful attention to the operation of the cupola, it too was melted satisfactorily and spun into fibers of acceptable quality.

The operation of the cupola was equally satisfactory when the briquettes contained quantities of cullett glass and other raw materials so long as the viscosity and the compositions of the glass were within the ranges named above.

Other glasses suitable for melting in a cupola are illustrated by the compositions shown in Table V.

TABLE V

*Glasses for melting in a cupola*

| Example No. | 5 | 6 | 7 | 8 | 9 | 10 | 11 | 12 | 13 | 14 |
|---|---|---|---|---|---|---|---|---|---|---|
| X | 1 | 1 | 0.5 | 0.93 | 1.5 | 0.53 | 1.5 | 1.0 | 0.82 | 1.0 |
| Y | 1 | 1 | 1.5 | 0.64 | 1.5 | 0.83 | 1.5 | 1.5 | 0.46 | 0.7 |
| Z | 3.5 | 5 | 5 | 4.27 | 3.5 | 4.15 | 5 | 4 | 4.65 | 4 |
| CaO, percent | 15.0 | 11.7 | 5.8 | 11.8 | 24.7 | 7.2 | 19.5 | 13.5 | 10.1 | 14.1 |
| $Na_2O$, percent | 16.6 | 13.0 | 19.2 | 15.4 | 9.1 | 21.9 | 7.2 | 15.0 | 15.9 | 15.6 |
| $B_2O_3$, percent | 18.7 | 14.7 | 21.7 | 10.2 | 30.8 | 14.5 | 24.3 | 25.3 | 7.0 | 12.3 |
| $SiO_2$, percent | 40.1 | 50.5 | 43.4 | 50.0 | 35.4 | 47.8 | 49.0 | 36.2 | 55.4 | 50.0 |
| Other, percent | 9.6 | 10.1 | 9.9 | 10.9 | | 9.8 | | 10.0 | 11.2 | 8.0 |
| Viscosity, poises at 2,200° F | | | | 19 | | 13 | | | 30 | |

While in the foregoing specification the embodiments of the invention have been set forth in considerable detail for purposes of illustrating the invention, it will be readily apparent to those skilled in the art that numerous changes may be made in those details without departing from the spirit and principles of the invention.

I claim:

1. A process of rapidly producing glass which comprises charging a cupola with lumps of coke and with briquettes formed of a mixture of finely divided glass-forming materials comprising silica and a material reactive with silica selected from the group consisting of a source of sodium oxide and a mixture of a source of a boron oxide and a source of sodium oxide, said silica-reactive material having a substantially lower melting point than silica, a portion of said coke being charged in a layer at the bottom of said cupola, a portion of said briquettes being charged over said layer of said coke, additional briquettes and lumps of coke being charged periodically over the materials previously charged to said cupola, burning said coke in a bed at the bottom of said cupola to melt at least a portion of said materials of said briquettes above said bed of burning coke and to cause the materials of said briquettes to flow through said bed of burning coke to form molten glass and to refine the same, and withdrawing said molten and refined glass from said cupola.

2. A process of rapidly producing glass which comprises charging a cupola with lumps of coke and with briquettes formed of a mixture of finely divided glass-forming materials comprising silica and a source of sodium oxide reactive with silica and having a substantially lower melting point than silica, a portion of said coke being charged in a layer at the bottom of said cupola, a portion of said briquettes being charged over said layer of said coke, additional briquettes and lumps of coke being charged periodically over the materials previously charged to said cupola, burning said coke in a bed at the bottom of said cupola to melt at least a portion of said materials of said briquettes above said bed of burning coke and to cause the materials of said briquettes to flow through said bed of burning coke to form molten glass and to refine the same, and withdrawing said molten and refined glass from said cupola.

3. A process of rapidly producing glass as in claim 2 wherein said source of sodium oxide is soda ash.

4. A process of rapidly producing glass which comprises charging a cupola with lumps of coke and with briquettes formed of a mixture of finely divided glass-forming materials comprising silica and other materials reactive with silica, including a source of sodium oxide and a source of a boron oxide, said silica reactive materials having substantially lower melting points than silica, a portion of said coke being charged in a layer at the bottom of said cupola, a portion of said briquettes being charged over said layer of said coke, additional briquettes and lumps of coke being charged periodically over the materials previously charged to said cupola, burning said coke in a bed at the bottom of said cupola to melt at least a portion of said materials of said briquettes above said bed of burning coke and to cause the materials of said briquettes to flow through said bed of burning coke to form molten glass and to refine the same, and withdrawing said molten and refined glass from said cupola.

5. A process of rapidly producing glass as in claim 4 wherein said source of sodium oxide is soda ash.

6. A process of rapidly producing glass as in claim 4 wherein said source of a boron oxide is a boron-containing mineral.

7. A process of rapidly producing glass as in claim 4 wherein said finely divided materials are selected to yield, upon being melted and reacted together, a glass including, by weight, about 4% to 31% $B_2O_3$ and 7% to 28% $Na_2O$.

8. A process of rapidly producing glass which comprises charging a cupola with lumps of coke and with briquettes formed of a mixture of finely divided glass-forming materials comprising silica, slag, soda ash and a boron-containing mineral having a substantially lower melting point than silica, a portion of said coke being charged in a layer at the bottom of said cupola, a portion of said briquettes being charged over said layer of said coke, additional briquettes and lumps of coke being charged periodically over the materials previously charged to said cupola, burning said coke in a bed at the bottom of said cupola to melt at least a portion of said materials of said briquettes above said bed of burning coke and to cause the materials of said briquettes to flow through said bed of burning coke to form molten glass and to refine the same, and withdrawing said molten and refined glass from said cupola.

References Cited by the Examiner

UNITED STATES PATENTS

| | | | |
|---|---|---|---|
| 1,061,158 | 5/1913 | Best | 263—27 |
| 1,656,828 | 1/1928 | Powell. | |
| 1,911,379 | 5/1933 | Marx | 263—27 |
| 2,395,231 | 2/1946 | McNeil | 65—1 X |
| 2,564,783 | 8/1951 | Howard | 263—27 |
| 2,597,640 | 5/1952 | Howard | 65—134 |
| 2,634,555 | 4/1953 | Henry et al. | 65—135 |
| 2,814,657 | 11/1957 | Labino | 65—1 X |
| 2,929,675 | 3/1960 | Von Wranan et al. | 65—2 |
| 2,958,161 | 11/1960 | Palmer | 263—29 X |
| 3,001,881 | 9/1961 | Slayter | 106—52 |
| 3,149,983 | 9/1964 | Maris et al. | 106—52 |
| 3,193,401 | 7/1965 | Alexander et al. | 106—54 |
| 3,198,615 | 8/1965 | Stalego | 65—2 |
| 3,198,642 | 8/1965 | Hagedorn | 106—54 |

FOREIGN PATENTS

| | | |
|---|---|---|
| 641,113 | 5/1962 | Canada. |
| 314,209 | 6/1929 | Great Britain. |
| 259,776 | 7/1949 | Switzerland. |

DONALL H. SYLVESTER, *Primary Examiner.*

F. W. MIGA, *Assistant Examiner.*